Figure 1:
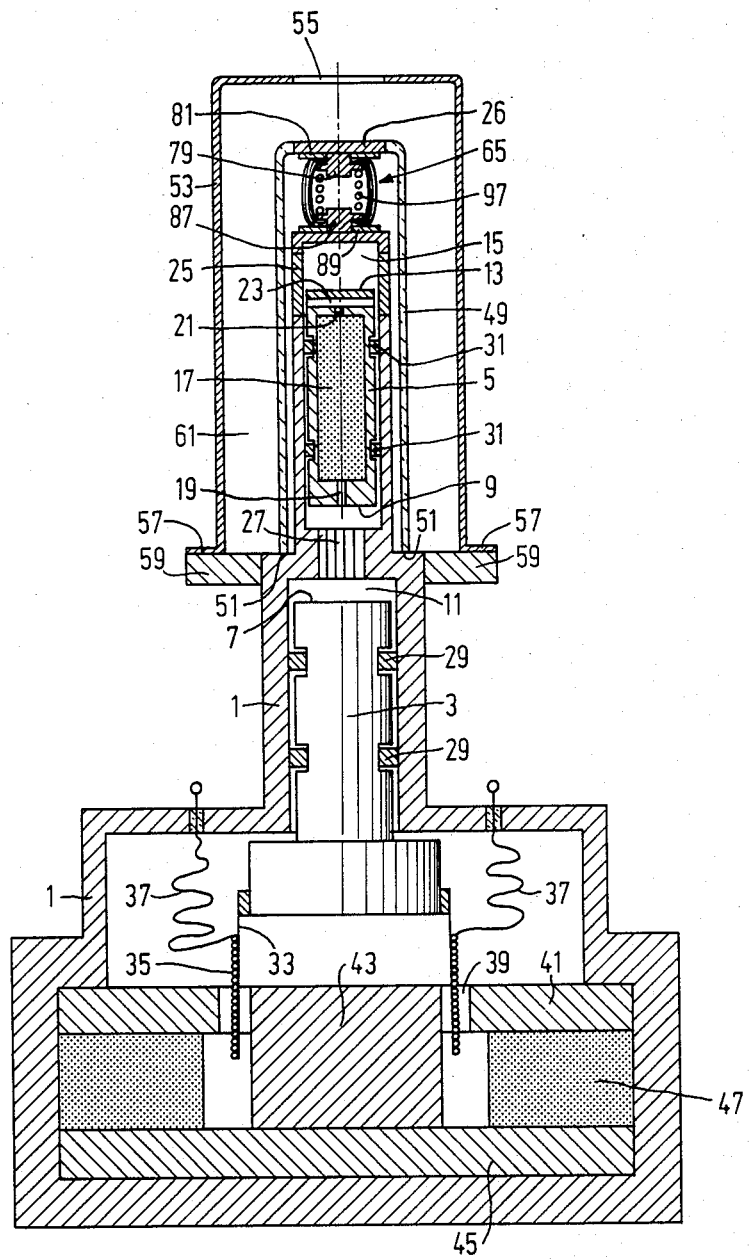

United States Patent [19]

Van Antwerpen

[11] Patent Number: 4,509,342
[45] Date of Patent: Apr. 9, 1985

[54] INFRARED RECEIVER HAVING A COOLED RADIATION DETECTOR

[75] Inventor: Hubrecht C. Van Antwerpen, Eindhoven, Netherlands

[73] Assignee: U.S. Philips Corporation, New York, N.Y.

[21] Appl. No.: 561,856

[22] Filed: Dec. 15, 1983

[30] Foreign Application Priority Data

Oct. 19, 1983 [NL] Netherlands ............... 8303603

[51] Int. Cl.³ ............................ F25B 19/00
[52] U.S. Cl. .................. 62/514 R; 165/185; 250/332
[58] Field of Search ......... 62/6, 514 R; 165/185; 250/332

[56] References Cited

U.S. PATENT DOCUMENTS

| | | | |
|---|---|---|---|
| 3,609,992 | 10/1971 | Cacheux | 62/514 R |
| 3,849,562 | 11/1974 | Dix et al. | 250/332 |
| 3,851,173 | 11/1974 | Taylor et al. | 62/514 R |
| 3,991,585 | 11/1976 | Mulder | 62/6 |
| 3,999,403 | 12/1976 | Bower et al. | 165/185 |

Primary Examiner—Ronald C. Capossela

[57] ABSTRACT

An infrared receiver having an infrared radiation detector cooled by means of a cold-gas engine, the thermal contact between a cooling surface of the cold-gas engine and the radiation detector being obtained by an elastic thermally conducting bridge. The cylindrical bridge is comprised of a plurality of turns of a metal strip. Due to the presence of the bridge, a good thermal conduction and further a compensation for differences in thermal expansion coefficients of the materials used are obtained. The infrared receiver is particularly suitable for night vision apparatus.

6 Claims, 3 Drawing Figures

INFRARED RECEIVER HAVING A COOLED RADIATION DETECTOR

The invention relates to an infrared receiver having a radiation detector in cold exchanging contact with a cooling surface of a cooler by means of a thermally conducting bridge between the cooling surface and the radiation detector, and wherein a support for the radiation detector constitutes an inner wall of a thermal isolation vessel.

In a known infrared receiver of the above kind (see U.S. Pat. No. 3,999,403), the thermally conducting bridge between the cooling surface and the radiation detector is comprised of an elastic bellow composed of a plurality of metal layers which may be of a similar or a different kind. These metal layers are applied by electro-deposition during the manufacture of the bridge to a bellow-shaped jig which is thereafter removed. Such a bridge is comparatively expensive due to the complicated manner in which it is manufactured. Moreover, it is anything but simple to find a compromise for the bellow construction used between a sufficient elasticity and a sufficient thermal conductivity of the bellow. A high thermal conductivity of the bellow in fact requires a weel cross-section which in the case of the bellow construction leads already comparatively soon to an excessively high rigidity of the bellow, as a result of which expansion differences between the various parts of the infrared receiver can be insufficiently compensated for.

The object of invention is the provision of an infrared receiver in which the said disadvantages are avoided.

An infrared receiver according to the invention is therefore characterised in that the bridge comprises an elastic metal cylinder of substantially rectangular cross-section and comprises of a plurality of turns of a metal strip secured in the proximity of each of its diametrically opposite sides between a mounting plate located inside the cylinder and a mounting plate located outside the cylinder, one mounting plate being located outside the cylinder and resiliently engaging the radiation detector, the other mounting plate resiliently engaging the cooling surface.

It should be noted that the U.S. Pat. No. 3,851,173 discloses an infrared receiver having an S-shaped metal bridge between the cooling surface and the radiation detector. The S-shaped construction has the disadvantage on the one hand that the distance for the cold conduction between the cooling surface and the radiation detector is comparatively large, whilst on the other hand due to the strong curvature of the S-form a comparatively high rigidity occurs and moreover it is difficult to guarantee that the end portions of the S-shaped bridge will be in flat engagement with the cooling surface and a plate in cold conducting contact with the radiation detector.

A particularly compact embodiment of an infrared receiver is obtained by arranging a helical spring in the cylinder the helical spring resiliently engaging the two mounting plates located inside the cylinder.

Figure 2:
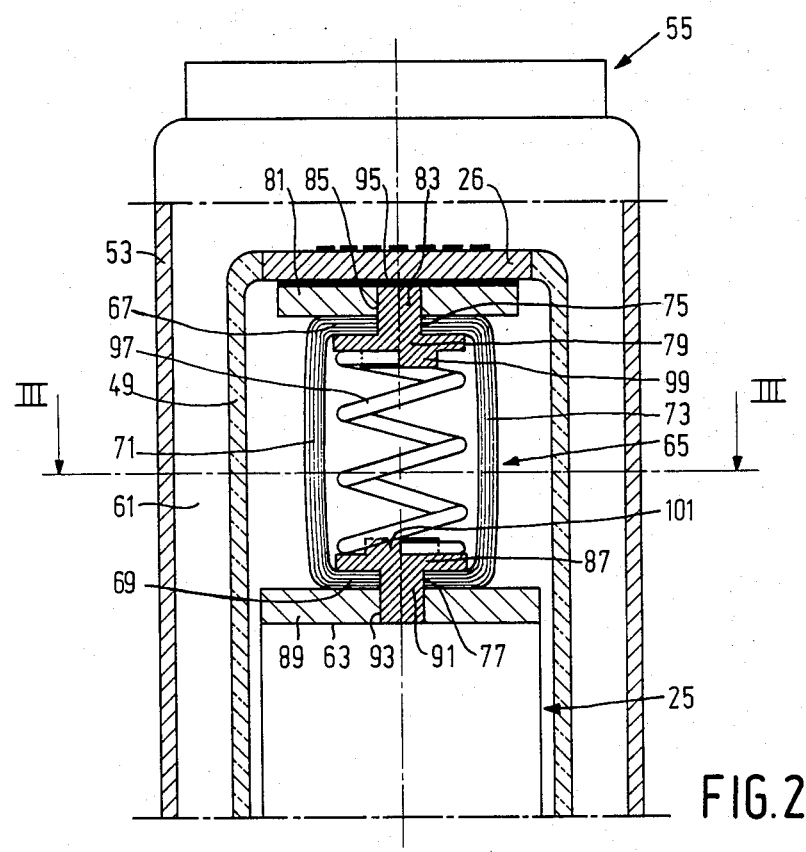
Figure 3:
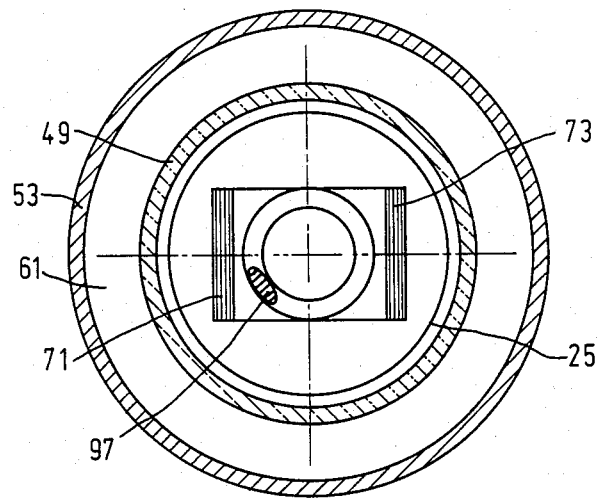

The invention will now be described more fully with reference to the drawing, in which:

FIG. 1 is a longitudinal sectional view of a preferred embodiment of an infrared receiver, FIG. 2 shows an enlarged detail of the infrared receiver shown in FIG. 1, and FIG. 3 is a sectional view taken on the line III—III of FIG. 2.

The receiver shown in FIG. 1 comprises a cold-gas engine (cryogenic cooler) having a cylindrical housing 1 filled with a gaseous working medium, such as, for example, helium. The housing 1 accommodates a piston 3 displaceable at the working frequency of the cold-gas engine and a free displacer 5 displaceable at the working frequency. The movements of the piston 3 and the displacer 5 are relatively shifted in phase. A compression space 11 of substantially constant comparatively high temperature is present between the working surface 7 of the piston 3 and the working surface 9 of the displacer 5. The upper working surface 13 of the displacer 5 limits an expansion space 15 of substantially constant comparatively low temperature. The compression space 11 and the expansion space 15 together constitute the working space of the cold-gas engine. The displacer 5 accommodates a regenerator 17 which is accessible to the working medium via a bore 19 on the lower side and via a bore 21 and radial ducts 23 on the upper side. The cold-gas engine has a freezer 25 which serves as a heat exchanger between the expanding cold working medium and a radiation detector 26 which is sensitive to infrared radiation. A cooler 27 serves as a heat exchanger between the compressed hot working medium and a cooling medium. Annular gaskets 29 are provided between the piston 3 and the housing 1, while annular gaskets 31 are provided between the displacer 5 and the housing 1. The piston 3 is driven by a line linear electric motor which comprises a sleeve 33 which is secured to the piston and on which is arranged an electrical coil 35 provided with connections 37. The coil 35 is displaceable in an annular gap 39 between a soft-iron ring 41 and a soft-iron cylinder 43. An axially polarised permanent ring magnet 47 is present between the ring 41 and a soft-iron disk 45. The cold-gas engine described so far is of a kind known per se (see U.S. Pat. No. 3,991,585), the operation of which is assumed herein to be known.

The radiation detector 26 of a kind known per se is arranged in the end surface of a bell-shaped glass support 49 which is secured by means of a glass-metal connection to a metal wall portion 51 of the cold-gas engine. The support 49 is enveloped by a bell-shaped metal cover 53 which is provided with an entrance window 55 for infrared radiation. The cover 53 has an annular flange 57 which is secured on a flange 59 of the cold-gas engine. This may be effected, for example, by a screw connection. A vacuum prevails in the space 61 between the support 49 and the cover 53. The support 49, the cover 53 and the vacuum space 61 consequently constitute together a thermal isolation vessel or a so-called Dewar vessel. A thermally good conducting elastic bridge 65 is arranged between a cooling surface 63 (see FIG. 2) of the freezer 25 and the radiation detector 26. The bridge 65 has a cylindrical cross-section of substantially rectangular shape and is comprises of a copper strip of at most 30 μm thickness wound onto a mandrel of substantially rectangular cross-section. In the present case the number of turns is 10. Tne bridge 65 has an upper side wall 67 and a lower side wall 69 which are connected to each other through side walls 71 and 73 (see FIG. 2). The side walls 67 and 69 are provided with coaxial openings 75 and 77. The upper side wall 67 is secured between a disk-shaped mounting plate 79 located inside the cylinder 65 and a disk-shaped mounting plate 81 located outside the cylinder 65. The mounting plate 79 is provided with a projection 83 which fits into the openings 75 of the upper side wall 67 and into an opening 85 in the mounting plate 81. By means of a weld, the projection 83 is welded around its periphery to the mounting plate 81. The lower side wall 69 is secured between a disk-shaped mounting plate 87 located inside the cylinder 65 and a disk-shaped mounting plate 89 located outside the cylinder 65. The mounting plate 87 is provided with a projection 91 which fits into the opening 77 of the lower side wall 69 and into an opening 93 in the mounting plate 89. By means of a weld, the projection 91 is welded around its periphery to the mounting plate 89. The mounting plate 81 is thermally connected to the radiation detector 26 by means of a heat-conducting paste 95, such as, for example, silicone grease with silver powder. The mounting plate 89 is secured by means of a metal connection, for example by soldering, to the cooling surface 63 of the freezer 25. The cylinder 65 accommodates a helical spring 97 (compression spring) which resiliently engages the mounting plates 79 and 87. The helical spring 97 is centered by means of centering edges 99 and 101 on the mounting plates 79 and 87.

Due to the fact that the glass support 49 is thermally coupled to the wall portion 51 (see FIG. 1), which is at a temperature of, for example, 300° K., while the metal part of the cold-gas engine extending into the support 49 is subjected to a temperature difference of, for example, 220° K., considerable thermal expansion differences are obtained, which are compensated for by the elastic flexible bridge/cylinder 65 and the helical spring 97. The main function of the cylinder 65 is to conduct a sufficient quantity of cold along the shortest possible trajectory from the cooling surface 63 of the freezer 25 to the radiation detector 26. The very high thermal conduction coefficient of copper and the comparatively large cross-section of the cylinder 65 (see FIG. 3) guarantee a sufficient transport of cold to the radiation detector 26. Besides, the cylinder 65 has the secondary function of compensating for differences in thermal expansion which result in a change of the distance between the cooling surface 63 and the radiation detector 26. This has inter alia the advantage that the thermal isolation vessel (Dewar vessel) constituted by the support 49 and the cover 53 need not satisfy extremely stringent tolerance requirements. Although the use of the helical spring 97 is not essential, nevertheless such a spring is preferably used to prevent differences in expansion from no longer being compensated for in the event that the cylinder 65 is plastically deformed for some reason or other—such as, for example, careless manipulation during the assembling process. Since due to maintenance of, for example, the cold-gas engine, processes of assembling and disassembling take place several times, this risk of deformation of the cylinder 65 is not excluded. The wound structure of the cylinder 65 provides for a comparatively large transport of cold over a shortest possible distance with sufficient elasticity. A cylinder of the same cross-section made in one piece would be too rigid. Moreover, the preliminary stress of the helical spring 97 ensures a good thermal contact between the cylinder 65 and the mounting plates 81 and 89.

It should be noted that the helical spring 97 may alternatively be arranged outside the cylinder 65. In this case, the cylinder 65 is situated inside the helical spring 97. Although the invention is described with reference to a cold-gas engine having a piston driven by a linear motor and is arranged coaxially with respect to the displacer, it is not limited thereto. For example, the piston may be driven via a crank drive rod mechanism. Further, the directions of the movements of the piston and the displacer may enclose an angle of 90° with each other, as is shown, for example, in U.S. Pat. No. 3,849,652. Moreover, the expansion space may be situated in a cylinder construction which is separated from the cylinder construction of the compression space. This is possible by the use of, for example, a (flexible) pipe connection between the compression space and the regenerator respectively expansion space.

What is claimed is:

1. In an infrared receiver having a radiation detector in cold exchanging contact with a cooling surface of a cooler by way of a thermally conducting bridge between the cooling surface and the radiation detector, and wherein a support for the radiation detector is comprised of an inner wall of a thermal isolation vessel; the improvement wherein the bridge comprises an elastic metal cylinder of substantially rectangular cross-section, said cylinder being comprised of a plurality of turns of a metal strip secured in the proximity of each of diametrically opposite sides thereof, each side being secured between a mounting plate located inside the cylinder and a mounting plate located outside the cylinder, one of the mounting plates located outside the cylinder resiliently engaging the radiation detector, the other of the mounting plates outside the cylinder resiliently engaging the cooling surface.

2. An infrared receiver as claimed in claim 1, wherein the cylinder surrounds a helical spring, said spring resiliently engaging the two mounting plates located inside the cylinder.

3. An infrared receiver as claimed in claim 2, wherein the mounting plates located inside the cylinder are each provided with a centering edge for receiving the helical spring.

4. An infrared receiver as claimed in claim 1, wherein the metal strip is made of rolled copper.

5. An infrared receiver as claimed in claim 1 wherein said sides of said cylinder comprise opposite side walls thereof.

6. An infrared receiver as claimed in claim 1 wherein said mounting plates located inside of said cylinder have projections extending through openings in said ends, said projections being secured to said mounting plates outside of said cylinder.

* * * * *